US010567395B2

(12) United States Patent
Gafni et al.

(10) Patent No.: US 10,567,395 B2
(45) Date of Patent: Feb. 18, 2020

(54) DETECTION OF POTENTIALLY MALICIOUS WEB CONTENT BY EMULATING USER BEHAVIOR AND USER ENVIRONMENT

(71) Applicant: HYPERWISE SECURITY LTD., Tel Aviv (IL)

(72) Inventors: Aviv Gafni, Ramat Gan (IL); Ben Omelchenko, Tel Aviv (IL); Tamir Zegman, Tel Aviv (IL)

(73) Assignee: Check Point Advanced Threat Prevention Ltd, Tel Aviv (IL)

( * ) Notice: Subject to any disclaimer, the term of this patent is extended or adjusted under 35 U.S.C. 154(b) by 0 days.

(21) Appl. No.: 14/708,248

(22) Filed: May 10, 2015

(65) Prior Publication Data

US 2016/0330215 A1    Nov. 10, 2016

(51) Int. Cl.
*H04L 29/06* (2006.01)
*G06F 21/56* (2013.01)

(52) U.S. Cl.
CPC ............ *H04L 63/14* (2013.01); *G06F 21/566* (2013.01); *G06F 21/567* (2013.01); *H04L 63/168* (2013.01)

(58) Field of Classification Search
CPC ............................. H04L 63/14; G06F 21/567
See application file for complete search history.

(56) References Cited

U.S. PATENT DOCUMENTS

| | | | |
|---|---|---|---|
| 8,220,054 B1 | 7/2012 | Lu | |
| 8,280,956 B2* | 10/2012 | Szabo | H04L 41/00 709/203 |
| 8,515,075 B1 | 8/2013 | Saraf | |
| 8,528,091 B2* | 9/2013 | Bowen | G06F 21/566 726/24 |
| 8,745,745 B2 | 6/2014 | Mooring | |
| 8,881,278 B2* | 11/2014 | Kaplan | H04L 63/0227 726/23 |
| 9,009,829 B2* | 4/2015 | Stolfo | G06F 21/554 726/23 |
| 9,215,245 B1* | 12/2015 | Rajab | H04L 63/1433 |
| 2004/0064712 A1 | 4/2004 | Arthur | |
| 2006/0136720 A1 | 6/2006 | Armstrong | |
| 2008/0016339 A1* | 1/2008 | Shukla | G06F 21/53 713/164 |
| 2009/0070878 A1* | 3/2009 | Wang | G06F 21/554 726/24 |

(Continued)

OTHER PUBLICATIONS

Chandrasekaran, Vidyaraman, Upadhyaya, SpyCon: Emulating User Activities to Detect Evasive Spyware. Computer Science and Engineering, University of Buffalo, IEEE 2007. (Year: 2007)*

(Continued)

*Primary Examiner* — Chau Le
*Assistant Examiner* — Vance M Little
(74) *Attorney, Agent, or Firm* — Mark M. Friedman (57) ABSTRACT

Methods and systems for the detection of receipt of potentially malicious web content by a web clients are disclosed. These methods and systems comprise elements of hardware and software for obtaining a sandbox environment on a server, wherein the sandbox is configured according to the system characteristics of the client device, emulating web requests and responses of the web client in the sandbox; and analyzing the behavior of components in the sandbox during processing of received web content.

34 Claims, 7 Drawing Sheets

System environment deploying embodiment of the invention (56) References Cited

U.S. PATENT DOCUMENTS

| | | |
|---|---|---|
| 2009/0079878 A1 | 3/2009 | Hao |
| 2009/0158432 A1 | 6/2009 | Zheng |
| 2010/0023810 A1 | 1/2010 | Stolfo |
| 2012/0311387 A1* | 12/2012 | Santhosh ............ G06F 11/3414 714/33 |
| 2013/0275945 A1 | 10/2013 | Kollberg |
| 2013/0283370 A1 | 10/2013 | Vipat |
| 2014/0115578 A1 | 4/2014 | Cooper |
| 2014/0215226 A1 | 7/2014 | Litty |
| 2014/0229942 A1 | 8/2014 | Wiseman |
| 2014/0283077 A1 | 9/2014 | Gallella |
| 2014/0372719 A1 | 12/2014 | Lange |
| 2015/0013008 A1* | 1/2015 | Lukacs ................... G06F 21/53 726/24 |
| 2015/0213259 A1* | 7/2015 | Du ...................... H04L 63/1466 726/27 |
| 2015/0286753 A1* | 10/2015 | Kurkure ............. G06F 17/5009 703/22 |

OTHER PUBLICATIONS

Liu, Jia, Xing, A Novel Behavior-Based Virus Detection Method for Smart Mobile Terminals. Hindawi Publishing Corporation, Discrete Dynamics in Nature and Society, vol. 2012, Article ID 262193. (Year: 2012).*

* cited by examiner

FIG. 1 - System environment deploying embodiment of the invention

FIG. 2 - System Architecture of Database Server

FIG. 3 - System Architecture of Inspection Server

FIG. 4 - Flow Diagram of Database Server interception interface processing

FIG. 5 - Flow Diagram of Database Server repository access process

FIG. 6 - Flow Diagram illustrating Sandbox creation process

FIG. 7 - Flow Diagram illustrating Inspection Server Web Protection process

DETECTION OF POTENTIALLY MALICIOUS WEB CONTENT BY EMULATING USER BEHAVIOR AND USER ENVIRONMENT

TECHNICAL FIELD OF THE INVENTION

The present invention relates to methods and systems for protecting devices from malicious digital content received during web browsing.

BACKGROUND

In recent years malicious software (or "malware") has become a persistent problem targeting computers and other devices in organizations and businesses for political and/or economic motives. One way of infiltrating a target computer or device is using active content on websites to serve as a malicious exploit.

The malicious downloaded active content can exploit a browser or a browser add-on vulnerability to take control of the browser.

The malicious downloaded active content can use techniques such as ROP (return oriented programming) to circumvent security measures in the browser and the operating system such as DEP (Data Execution Prevention) or ASLR (Address Space Layout Randomization).

A security technique called "sandboxing" aims at detecting malware code by forcing downloaded active content to run in a dedicated simulated virtual environment on a computer based system of one type or another to analyze it for behavior and traits indicative of malware. A sandbox system tries to get infected by the malware and analyzes its behavior inside the simulated virtual environment. Currently, sandboxing is a leading alternative to traditional signature-based malware defenses, and it is used to spot and analyze previously unknown malware and stealthy attacks in particular.

However, sandboxing does not detect all malware, such as in cases where particular user configurations or user actions are required to activate the exploit.

SUMMARY OF THE INVENTION

The present invention provides methods and systems for obtaining a sandbox environment on a server, wherein the sandbox is configured according to the system characteristics of the client device, emulating web requests and responses of the web client in the sandbox, and analyzing the behavior of components in the sandbox during processing of received web content.

This document references terms that are used consistently or interchangeably herein. These terms, including variations thereof, are as follows:

A "computer" includes machines, computers and computing or computer systems (for example, physically separate locations or devices), servers, computer and computerized devices, processors, processing systems, computing cores (for example, shared devices), and similar systems, workstations, modules and combinations of the aforementioned. The aforementioned "computer" may be in various types, such as a personal computer (e.g., laptop, desktop, tablet computer), or any type of computing device, including mobile devices that can be readily transported from one location to another location (e.g., smartphone, personal digital assistant (PDA), mobile telephone or cellular telephone).

A "server" is typically a remote computer or remote computer system, or computer program therein, in accordance with the "computer" defined above, that is accessible over a communications medium, such as a communications network or other computer network, including the Internet. A "server" provides services to, or performs functions for, other computer programs (and their users), in the same or other computers. A server may also include a virtual machine, a software based emulation of a computer.

An "application", includes executable software, and optionally, any graphical user interfaces (GUI), through which certain functionality may be implemented.

The term "linked" as used herein includes both wired or wireless links, either direct or indirect, and placing the computers, including, servers, components and the like, in electronic and/or data communications with each other.

Embodiments of the present invention are directed to a method, which is computer-implemented, for detecting receipt of potentially malicious web content by a web client. The method comprises: obtaining a sandbox environment on a server, wherein the sandbox is configured according to the system characteristics of the client device; emulating web requests and responses of the web client in the sandbox; and analyzing the behavior of components in the sandbox during processing of received web content.

Optionally, the analyzing the behavior of components in the sandbox comprises monitoring an operating system registry.

Optionally, the analyzing the behavior of components in the sandbox comprises monitoring a file system.

Optionally, the analyzing the behavior of components in the sandbox comprises monitoring network traffic.

Optionally, the analyzing the behavior of components in the sandbox comprises tracing the CPU and analyzing the log.

Optionally, the analyzing the behavior of components in the sandbox comprises monitoring function calls.

Optionally, an alert is raised upon detecting receipt of potentially malicious web content.

Optionally, system characteristics of the client device are learned from the HTTP (Hyper Text Transfer Protocol) User-Agent attribute.

Optionally, system characteristics of the client device are learned via an agent on the client device.

Optionally, the emulating web requests and responses of the web client in the sandbox comprises emulating user activities in the web browser.

Optionally, the requests of the web client are intercepted and stored to a repository for emulation in the sandbox.

Optionally, the responses directed to the web client are intercepted and stored to a repository for emulation in the sandbox.

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings.

DETAILED DESCRIPTION OF DRAWINGS

Figure 1:
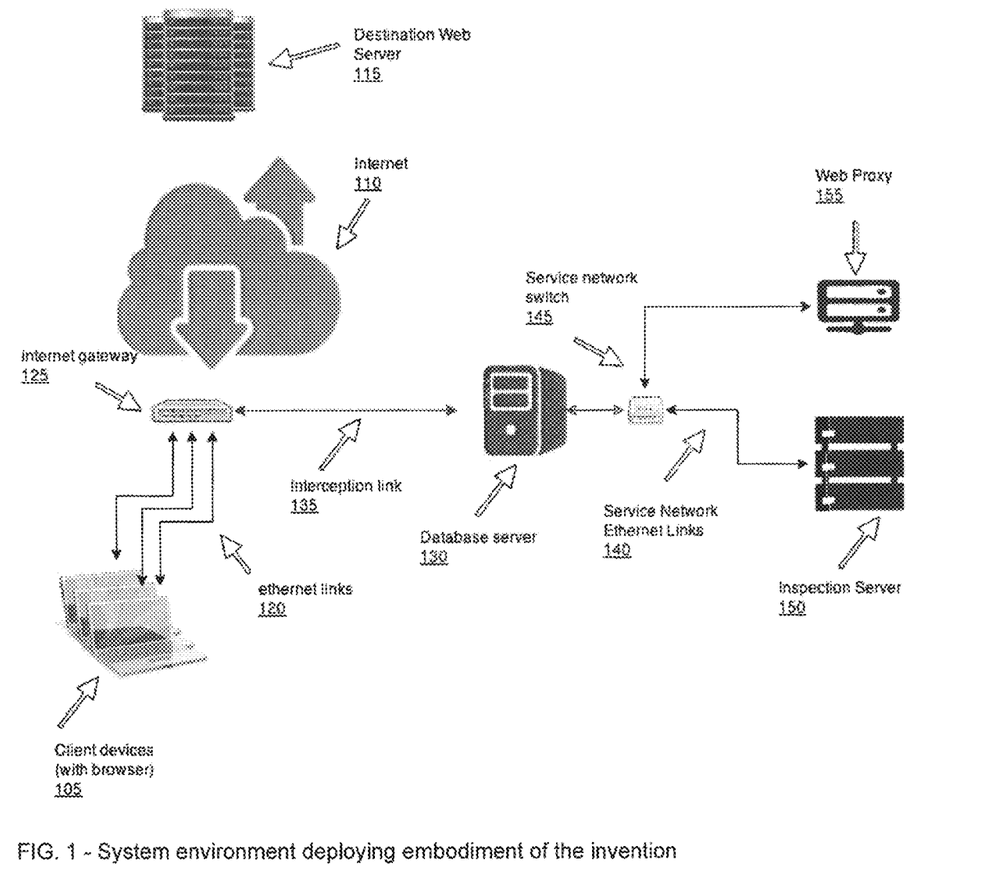
FIG. 1 is a diagram illustrating a system environment in which an embodiment of the invention is deployed.

FIG. 1 shows an exemplary system environment employing an embodiment of the invention.

Client devices 105 in, for example, an organization are involved in browsing websites via, for example, the Internet 110. The clients are linked via, for example, ethernet links 120 to, for example, an Internet Gateway 125 which in turn connects to, for example, the Internet 110. Web content is transmitted in an HTTP response from a particular destination web server 115 to a particular client device 105 upon receipt of an HTTP request from the specific client 105. Malware is potentially carried in HTTP responses from a destination web server 115 to a client device 105.

A server called the Database Server 130 is also linked to, for example, the Internet Gateway 125 via, for example, the interception link 135 which is, for example, an ethernet link that operates in sniffer mode so that all packet traffic received by the Internet Gateway 125 (from any input port) is received by the listener on the Interception Link 135. The Database Server 130 receives all packets from the Interception Link 135 and stores, for example, all the HTTP requests and HTTP responses that it receives over the Interception Link 135 so that they may be accessed subsequently by the Inspection Server 150.

Optionally, Client Devices 105 may include a module called the Agent, which communicates information regarding, for example, the client device's 105 hardware, operating system, and browser configuration to the Database Server 130. Additionally, the Agent may communicate, for example, real time user activity information such as keyboard usage and mouse clicks to the Database Server 130.

When the Agent on a specific client device 105 communicates this information to the the Database Server 130, the Database Server 130, for example, stores the information, so that it may be accessed subsequently by, for example, the Inspection Server 150.

The Database Server 130 has, for example, an additional ethernet link 140 to a Service Network Switch 145. The Inspection Server 150 and the Web Proxy 155 are also, for example, linked to the Service Network Switch 145 via, for example, ethernet links 140.

The Inspection Server 150 monitors, for example, the Database Server 130 for the initialization and termination of Client Device 105 instances (for example, as reported by the Agent, or as detected in the Database Server via HTTP transactions). For a particular Client Device 105 instance that is to be protected, the Inspection Server 150 creates or obtains a sandbox environment for emulation of, for example, the hardware, operating system, browser, and other characteristics of the particular Client Device 105. The sandbox environment utilizes, for example, virtual machine technology to accurately emulate the protected Client Device 105 with its operating system and applications.

The Inspection Server 150 also monitors, for example, the session-specific HTTP request traffic that is being stored in real time into the database server, and runs the HTTP requests in the sandboxed browser environment.

The Inspection Server 150 may also monitor, for example, the realtime user activity data sent by the Agent located on the Client Device 105 and applies these user activities (eg. keyboard presses and mouse clicks) to the session in the sandboxed browser environment.

The Web Proxy 155, for example, intercepts HTTP requests transmitted from a browser in a sandbox environment on the Inspection Server 150, and sends HTTP responses back to the requesting browser in a manner that is, for example, undetected by the browser. The Web Proxy 155 gets the HTTP response data from, for example, the HTTP transaction data that has been stored in the the Database Server 130. In this manner, the sandboxed browser environment in the Inspection Server 150 closely emulates the web activity of the Client Device 105.

The Inspection Server 150 monitors the sandboxed environment for, for example, signs of anomalous or malicious behavior, and, for example, raises an alert upon detection of such.

The system environment has been exemplarily described with reference to physical servers linked via ethernet. However, the servers may also, for example, be implemented as virtual servers, or as a group of elastically provisioned servers in a cloud environment. Also, the server functionalities may be implemented, for example, as functional components within one or more servers with a different distribution of the functions among the physical or virtual servers. Similarly, the components may be linked, for example, with different wired or wireless media, or with virtual communication links. The number and locations of the gateways and switches is exemplary only, and actual deployments may include, for example, more or fewer gateways and switches, or, for example, include switches and gateways in locations other than the ones described.

The system environment has been exemplarily described with reference to a Web Proxy 155 which retrieves data from the Database Server 130. However, in other embodiments, the Inspection Server 150 may, for example, access the Internet 110 and Destination Web Server 115 directly.

Figure 2:
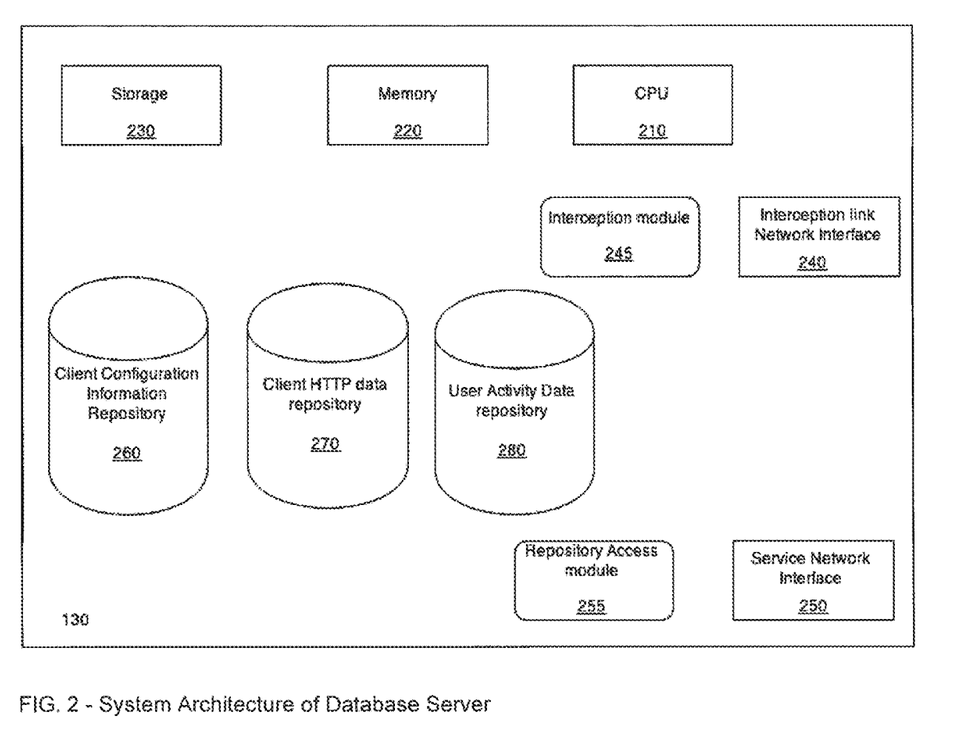
FIG. 2 is a diagram of the architecture of an exemplary database server embodying the invention.

FIG. 2 shows an exemplary system architecture for the Database Server 130.

The Database Server 130 includes a central processing unit (CPU) 210 formed of one or more processors, electronically connected, including in electronic and/or data communication with memory 220, storage 230, Interception Link Interface 240 and Service Network Interface 250, Interception Module 245, Client Configuration Information Repository 260, Client HTTP data repository 270, and Client user activity data repository 280.

Figure 4:
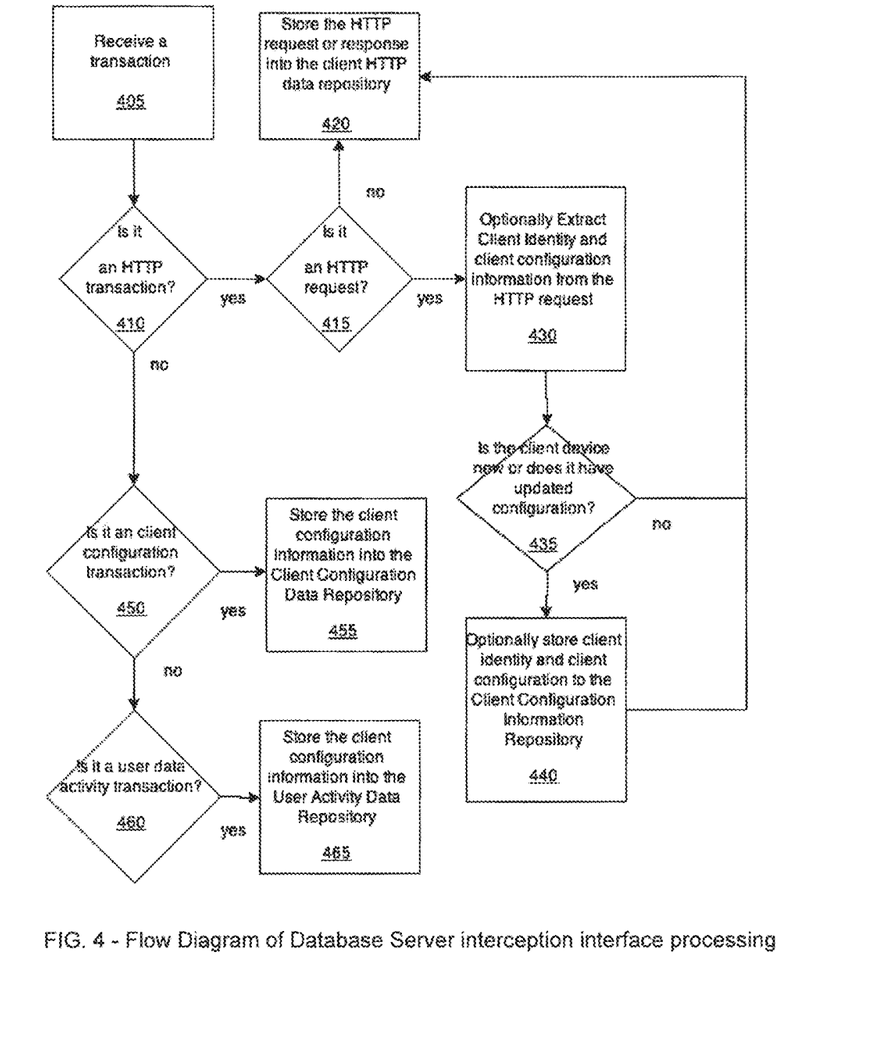
FIG. 4 is a flow diagram illustrating the interception process executed by the the database server.
Figure 5:
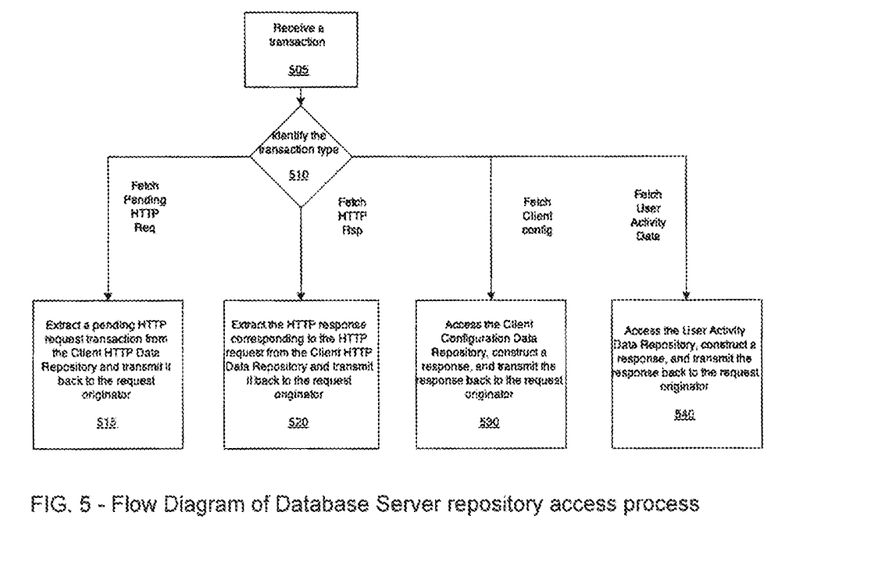
FIG. 5 is a flow diagram illustrating the request handling process executed by the database server.

The Central Processing Unit (CPU) 210 is formed of one or more processors, including physical or virtual microprocessors, for performing the Database Server 130 functions and operations detailed herein, including controlling the memory 220, storage 230, Interception Link Interface 240 and Service Network Interface 250, Interception Module 245, Client Configuration Information Repository 260, Client HTTP data repository 270, and Client user activity data repository 280, along with the processes shown in FIGS. 4 and 5, and detailed below. The processors are, for example, conventional processors, such as those used in servers, computers, and other computerized devices. For example, the processors may include x86 Processors from AMD and Intel, Xeon® and Pentium® processors from Intel, as well as any combinations thereof.

The memory 220 is any conventional memory media. The memory 220 stores machine executable instructions associated with the operation of the components, including, Interception Link Interface 240 and Service Network Interface 250, Interception Module 245, Client Configuration Information Repository 260, Client HTTP data repository 270, Client user activity data repository 280 and all instructions for executing the process of FIGS. 4 and 5, detailed herein. The processors of the CPU 210, memory 220, and storage 230 although each shown as a single component for representative purposes, may be multiple components, and may be outside of the Database Server 130, and linked to the Interception Link Interface 240 or Service Network Interface 250.

The Interception Link Network Interface 240 is a physical, virtual, or logical data link for communication over the Interception Link 135. The Interception Link Network Interface 240 operates, for example, in promiscuous reception mode, so that it can receive all packets from the Interception Link 135 regardless of the packet's destination address. Similarly, the Service Network Interface 250 is a physical, virtual, or logical data link for communication with, for example, the Inspection Server 150 and Web Proxy 155. Alternatively, the Database Server 130 may, for example, comprise a single network interface to both the Interception Link 135 and Service Network Ethernet Links 140 in conjunction with Virtual Local Area Networks (VLANs) or the like.

The Interceptor Module 220 is exemplarily a software module which receives all the packet traffic arriving over the Interception Link Network Interface 240. The Interceptor Module 220 processes the packets, and according to the content of the packets populates the Client Configuration Information Repository 260, Client HTTP data repository 270, and Client User Activity Data Repository 280 according to the process illustrated in FIG. 4 below.

The Client Configuration Information Repository 260 is a database that maintains information pertaining to the system details of Client Devices 105 in the protected environment. The information maintained per Client Device 105 may include, for example, identification information such as MAC address or IP address and the like. The information maintained per Client Device 105 may also include, for example, hardware parameters such as CPU type, memory size, disk sizes, port information, and the like. The information maintained per Client Device 105 may also include, for example, operating system information such as operating system type, release, add-on modules, installed applications and the like. The information maintained per Client Device 105 may also include, for example, installed browser information such as browser type, release, add-on modules, and the like.

The Client HTTP Data Repository 270 is a database that stores the HTTP request and response traffic that was sent by or addressed to Client Devices 105. The HTTP requests and responses stored in the database are indexed, for example, according to an identifier of the specific Client Device such as MAC Address, IP address, or the like.

The Client User Activity Data Repository 280 is a database that stores records of user device activity (such as keyboard presses, mouse clicks, and the like) so that these may be used in conjunction with the sandboxed emulated browser sessions run by the inspection server. The user activity records stored in the Client User Activity Data Repository 280 may include, for an example, an identifier of the specific Client Device such as MAC Address, IP address, or the like. The user activity logs stored in the database may also include, for example, timestamps or URL identifiers, or other data which allows correlation of user activity with HTTP transactions.

The Client Configuration Information Repository 260, Client HTTP Data Repository 270, and Client User Activity Data Repository 280 are implemented, for example, as software databases using database technologies such as SQL server or the like.

The Repository Access Module 255 is exemplarily a module which receives requests from, for example, the Inspection Server 150 for data stored in the Client Configuration Information Repository 260, Client HTTP Data Repository 270, or Client User Activity Data Repository 280 and creates and transmits responses accordingly.

Figure 3:
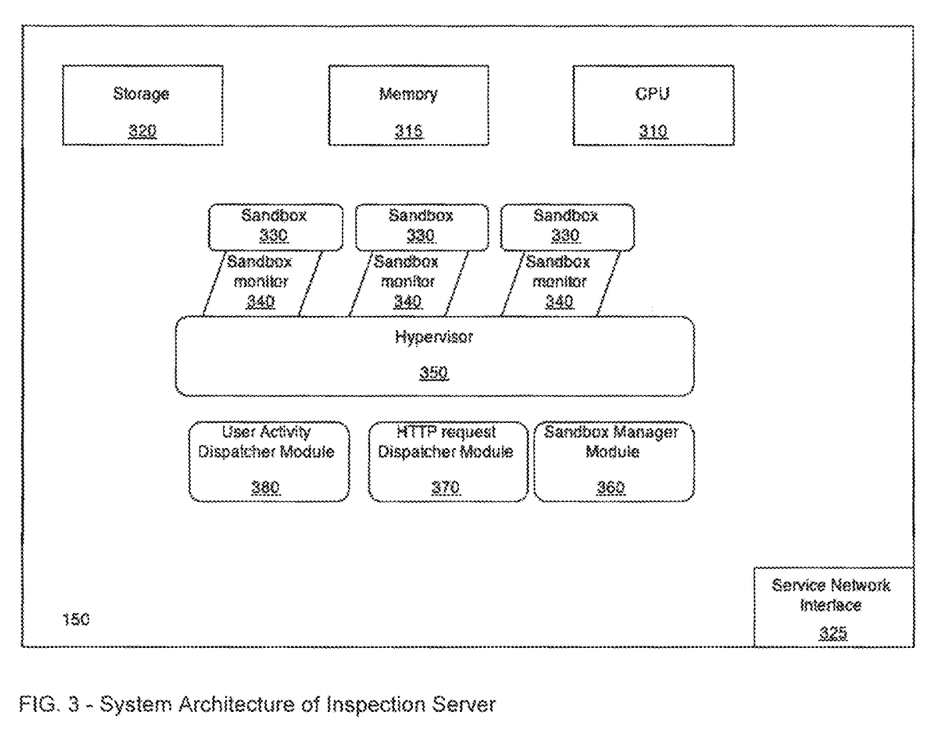
FIG. 3 a diagram of the architecture of an exemplary inspection server embodying the invention.

FIG. 3 shows an exemplary system architecture for the Inspection Server 150.

The Inspection Server 150 includes a central processing unit (CPU) 310 formed of one or more processors, electronically connected, including in electronic and/or data communication with memory 315, storage 320, Service Network Interface 325, Sandboxes 330, Sandbox Monitors 340, Hypervisor 350, Sandbox Manager Module 360, HTTP Request Dispatcher Module 370, and User Activity Dispatcher Module 380.

Figure 6:
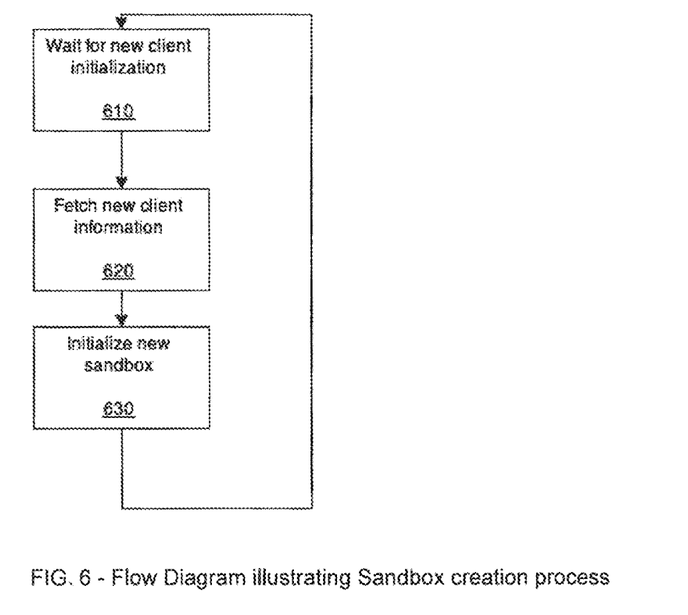
FIG. 6 is a flow diagram illustrating sandbox creation process of the inspection server.
Figure 7:
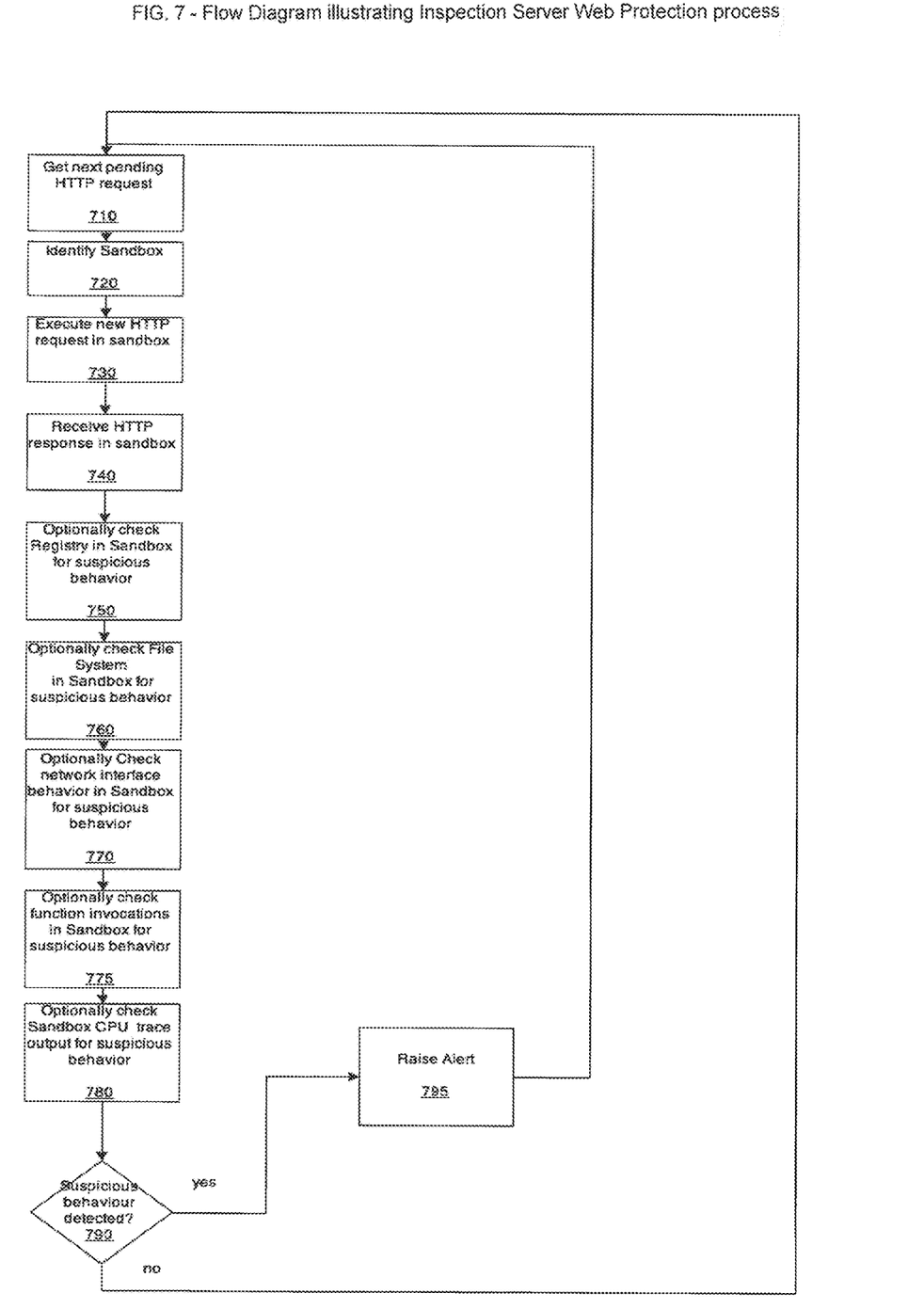
FIG. 7 is a flow diagram illustrating the the web protection process of the inspection server.

The Central Processing Unit (CPU) 310 is formed of one or more processors, including physical or virtual microprocessors, for performing the Inspection Server 150 functions and operations detailed herein, including controlling the 315, storage 320, Service Network Interface 325, Sandboxes 330, Sandbox Monitors 340, Hypervisor 350, Sandbox Manager Module 360, HTTP Request Dispatcher Module 370, and User Activity Dispatcher Module 380, along with the processes shown in FIGS. 6 and 7, and detailed below. The processors are, for example, conventional processors, such as those used in servers, computers, and other computerized devices. For example, the processors may include x86 Processors from AMD and Intel, Xeon® and Pentium® processors from Intel, as well as any combinations thereof.

The memory 315 is any conventional memory media. The memory 315 stores machine executable instructions associated with the operation of the components, including Service Network Interface 325, Sandboxes 330, Sandbox Monitors 340, Hypervisor 350, Sandbox Manager Module 360, HTTP Request Dispatcher Module 370, and User Activity Dispatcher Module 380, and all instructions for executing the process of FIGS. 6 and 7 detailed herein. The processors of the CPU 310, memory 315, and storage 320 although each shown as a single component for representative purposes, may be multiple components, and may be outside of the Inspection Server 150, and linked to the Service Network Interface 325.

The Service Network Interface 325 is a physical, virtual, or logical data link for communication with, for example, the Database Server 130 and Web Proxy 155.

The Hypervisor 350 may be, for example, any hypervisor appropriate for the server's operating system (eg. Kernel-based Virtual Machine for Linux). The Hypervisor 350 supervises the operation of, for example, multiple Sandbox 330 instances, where each Sandbox 330 is, for example, implemented as Virtual Machine. Each instance of the Sandbox Monitor 340 is, for example, installed in a specific Sandbox 330 and monitors the Sandbox 330 environment for signs of anomalous behavior in accordance with the process shown in FIG. 7.

The Sandbox Manager Module 360 monitors, for example, the initiation and termination of Client Devices 105 as represented in the Client Configuration Information Repository 260 of the Database Server 130 and, for example, creates and terminates Virtual Machine sandboxes with system configuration parameters which, for example, mirror the system configuration parameters of the particular Client Device 105. The monitoring of the Client Configuration Information Repository 260 of the Database Server 130 may be accomplished, for example, by sending and receiving messages over the Service Network Interface 325.

The system configuration parameters configured in the Sandbox 330 and its associated Virtual Machine may include, for example: CPU type, memory configuration, storage device configuration, network interface configuration, type and version of operating system, operating system patches, installed applications and plugins/extensions, installed browsers/versions/extensions and the like.

The HTTP Dispatcher Module 370 monitors, for example, the URL (Universal Resource Locator) requests by Client Devices 105 as represented in the Client HTTP Data Repository 270 of the Database Server 130 and, for example, causes a browser in the corresponding Sandbox 330 environment to request the same URL. The monitoring of the Client HTTP Data Repository 270 of the Database Server 130 may be accomplished, for example, by sending and receiving messages over the Service Network Interface 325.

The User Activity Dispatcher Module 380 monitors, for example, the user behaviors performed on Client Devices 105 as represented in the User Activity Data Repository 280 of the Database Server 130 and, for example, causes the same user activity (eg. mouse click) to occur in the corresponding Sandbox 330. The monitoring of the User Activity Data Repository 270 of the Database Server 130 may be accomplished, for example, by sending and receiving messages over the Service Network Interface 325.

The system environment has been exemplarily described with reference to a Sandbox 330 is implemented as a virtual machine managed by a Hypervisor 350. However, in other embodiments, the Sandbox 330 may, for example, be implemented in an operating system process, in a remote physical server, or the like.

FIG. 4 shows the process executed by the Interception Module 245 component of the Database Server 130.

The term "transaction" is here defined to refer to an application-layer protocol message. Examples of a transaction include: an HTTP request or response, or a proprietary message to read a particular record from a repository. The process receives an incoming transaction by receiving and possibly assembling it from packets arriving on a network interface.

At block 405, a transaction is received from, for example, the Interception Link Network Interface 240.

At block 410, the content of the transaction is analyzed. If the transaction is an HTTP request or response, control is transferred to block 415, where the type of HTTP transaction is examined. If the transaction is an HTTP response, then at block 420 the transaction data is, for example, stored to the Client HTTP Data Repository 270.

If, on the other hand, the transaction is an HTTP request, then control proceeds to block 430 and optionally any available client information is, for example, extracted from the HTTP request. This information may include, for example, the client device IP address, screen resolution, browser type, and the like. An embodiment of the invention may, for example, make use of this information to supplement the information supplied by an Agent that is located on the Client Device 105 in populating the Client Configuration Information Repository 260. Alternatively an embodiment may, for example, populate the Client Configuration Information Repository 260 only using the information extracted from the intercepted HTTP requests. At block 435, the process checks if the client is new or has updated configuration information, and if so then at block 440 the information is stored to the Client Configuration Information Repository 260. Finally control transfers to block 420 and the HTTP request transaction itself is stored to the Client HTTP Data Repository 270.

If the transaction evaluated at block 410 is not HTTP, control proceeds to block 450, where the process evaluates whether the transaction is a message from an Agent on a Client Device 105. If so, then at block 455, the client configuration information is stored to the Client Configuration Information Repository 260.

Finally, at block 460 the process evaluates whether the transaction carries user activity data (ie. keyboard presses, mouse clicks, or the like), and if so at block 465 the user activity information is stored to the User Activity Data Repository 270.

FIG. 5 illustrates the process executed by the Database Server 130 to handle transactions from, for example, the Inspection Server 150.

At block 505 a transaction is received from, for example, the Inspection Server 150.

At block 510, the process examines the transaction to, for example, determine its transaction type. Four transaction types are, for example, recognized: Fetch Pending HTTP Request, Fetch HTTP Response, Fetch Client Configuration Information, and Fetch User Activity Data.

For a "Fetch Pending HTTP Request" transaction, control is transferred to block 515. The transaction request includes, for example, an identifier uniquely specifying a client device instance. At block 515, the process prepares and transmits a response transaction comprising, for example, the next HTTP request from the Client HTTP Data Repository 270 that was observed to originate from the specified client device instance.

For a "Fetch HTTP Response" transaction, control is transferred to block 520. The transaction request includes, for example, an identifier uniquely specifying a client device instance and a full HTTP Request (including source and destination IP addresses) for a particular URL (Universal Resource Locator). At block 530, the process prepares and transmits a response transaction comprising, for example, the HTTP response that was observed to originate from the requested server in response to the supplied HTTP request from the Client HTTP Data Repository 270.

For a "Fetch Pending HTTP Request" transaction, control is transferred to block 530. The transaction request includes, for example, an identifier uniquely specifying a client device instance. At block 530, the process prepares and transmits a response transaction comprising, for example, the hardware, operating system, and browser characteristics for the specified client device and other information as stored in the Client Configuration Information Repository 260.

For a "Fetch User Activity Data" transaction, control is transferred to block 540. The transaction request includes, for example, an identifier uniquely specifying a client device instance. At block 540, the process prepares and transmits a response transaction comprising, for example, information regarding the user's keyboard, mouse, or other activity from the User Activity Data Repository 270.

FIG. 6 exemplarily illustrates the Sandbox 330 creation process conducted by, for example, the Sandbox Manager Module 360 of the Inspection Server 150.

At block 610, the process waits for an indication that a new Client Device 105 has initialized. For example, the Sandbox Manager module 260 may communicate with Database Server 130 to read information from the Client Configuration Information Repository 260. At block 620, the process determines the system configuration information (CPU type, Operating System, and the like) by, for example, analyzing information already obtained from the Client Configuration Information Repository 260 of the Database Server 130. Finally, at block 630, the process initializes a new Sandbox 330 which, for example, has its system configuration parameters set according to the parameters of the detected Client Device 105. To do this, the Sandbox Manager module 260 may, for example, instruct the hypervisor to create a new virtual machine.

FIG. 7 illustrates the web protection process executed by, for example, modules of the Inspection Server 150.

At block 710, the process retrieves a pending HTTP request that was made a particular Client Device 105 instance from the Database Server 130. At block 720, the process identifies the Sandbox 330 instance associated with the Client Device instance. At block 730 the process causes a browser instance in the particular Sandbox 330 to issue a request for the URL indicated in the HTTP request. At block 740, the process waits for the response to the HTTP request to arrive. This response may, for example, arrive from the Web Proxy 155 which in turn may, for example, extract the response from the Database Server 130. At block 750, the process begins to check the sandbox 330 for indications of suspicious activity. At block 750 the process optionally examines the registry of the sandbox 330 for signs of malware impact. At block 760, the process optionally examines the file system. At block 770, the process optionally examines the recent behavior of the network interfaces of the Sandbox 330 for signs of malware. At block 775, the process optionally examines the function invocation behavior of the Sandbox 330 for signs of malware. At block 780, the process optionally examines the log produced by CPU tracing for signs of malware such as, for example, return-oriented programming. At block 790, the process evaluates whether any of the checks on malicious impact were positive, and if so an alert is raised at block 795.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, non-transitory storage media such as a magnetic hard-disk and/or removable media, for storing instructions and/or data. Optionally, a network connection is provided as well. A display and/or a user input device such as a keyboard or mouse are optionally provided as well.

For example, any combination of one or more non-transitory computer readable (storage) medium(s) may be utilized in accordance with the above-listed embodiments of the present invention. The non-transitory computer readable (storage) medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

As will be understood with reference to the paragraphs and the referenced drawings, provided above, various embodiments of computer-implemented methods are provided herein, some of which can be performed by various embodiments of apparatuses and systems described herein and some of which can be performed according to instructions stored in non-transitory computer-readable storage media described herein. Still, some embodiments of computer-implemented methods provided herein can be performed by other apparatuses or systems and can be performed according to instructions stored in computer-readable storage media other than that described herein, as will become apparent to those having skill in the art with reference to the embodiments described herein. Any reference to systems and computer-readable storage media with respect to the following computer-implemented methods is provided for explanatory purposes, and is not intended to limit any of such systems and any of such non-transitory computer-readable storage media with regard to embodiments of computer-implemented methods described above.

Likewise, any reference to the following computer-implemented methods with respect to systems and computer-readable storage media is provided for explanatory purposes, and is not intended to limit any of such computer-implemented methods disclosed herein.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the singular form "a", "an" and "the" include plural references unless the context clearly dictates otherwise.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

The above-described processes including portions thereof can be performed by software, hardware and combinations thereof. These processes and portions thereof can be performed by computers, computer-type devices, workstations, processors, micro-processors, other electronic searching tools and memory and other non-transitory storage-type devices associated therewith. The processes and portions thereof can also be embodied in programmable non-transitory storage media, for example, compact discs (CDs) or other discs including magnetic, optical, etc., readable by a machine or the like, or other computer usable storage media, including magnetic, optical, or semiconductor storage, or other source of electronic signals.

The processes (methods) and systems, including components thereof, herein have been described with exemplary reference to specific hardware and software. The processes (methods) have been described as exemplary, whereby specific steps and their order can be omitted and/or changed by persons of ordinary skill in the art to reduce these embodiments to practice without undue experimentation. The processes (methods) and systems have been described in a manner sufficient to enable persons of ordinary skill in the art to readily adapt other hardware and software as may be needed to reduce any of the embodiments to practice without undue experimentation and using conventional techniques.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A method for detecting receipt of potentially malicious web content by a web client associated with a client device, comprising:
   providing a hypervisor for generating and supervising the operation of sandboxes for client devices, each of the sandboxes implemented as a virtual machine;
   obtaining a sandbox on a server, the server including an operating system managed by the hypervisor, wherein the sandbox is configured according to system characteristics of the client device;
   obtaining user activity data from a user activity data repository;
   emulating web requests and responses of the client device by the virtual machine associated therewith, based on content of the user activity data, as implemented in the sandbox;
   receiving web content from a remote service in response to the emulated web requests and responses of the client device, by the virtual machine; and
   analyzing the behavior of the received web content in the sandbox for indications of at least one of anomalous or potentially malicious behavior.

2. The method of claim 1, wherein the analyzing the behavior of the received web content in the sandbox for indications of at least one of anomalous or potentially malicious behavior, comprises monitoring an operating system registry.

3. The method of claim 1, wherein the analyzing the behavior of the received web content in the sandbox for indications of at least one of anomalous or potentially malicious behavior, comprises monitoring a file system.

4. The method of claim 1, wherein the analyzing the behavior of the received web content in the sandbox for indications of at least one of anomalous or potentially malicious behavior, comprises monitoring network traffic.

5. The method of claim 1, wherein the analyzing the behavior of the received web content in the sandbox for indications of at least one of anomalous or potentially malicious behavior, comprises tracing a Central Processing Unit (CPU) of the client device and analyzing a log thereof.

6. The method of claim 1, wherein the analyzing the behavior of the received web content in the sandbox for indications of at least one of anomalous or potentially malicious behavior, comprises monitoring function calls.

7. The method of claim 1, wherein an alert is raised upon detecting anomalous or potentially malicious behavior of the web content.

8. The method of claim 1 wherein system characteristics of the client device are learned from an HTTP User-Agent attribute.

9. The method of claim 1, wherein system characteristics of the client device are learned via an agent on the client device.

10. The method of claim 1, wherein the user activity data is based on user activities in the web browser of the client device.

11. The method of claim 1, wherein the requests of the client device are intercepted and stored to a repository for emulation in the sandbox.

12. The method of claim 11 wherein the responses directed to the client device are intercepted and stored to a repository for emulation in the sandbox.

13. The method of claim 1, wherein the system characteristics of the client device include configuration parameters for the client device.

14. The method of claim 1, wherein the user activity repository obtains the user activity data from an agent on the client device.

15. The method of claim 14, wherein the user activity data includes one or more of: activities in the web browser of the client device, keyboard presses, and mouse clicks.

16. A computer system for detecting receipt of potentially malicious web content by a web client associated with a client device, comprising:
a hypervisor for generating and supervising the operation of sandboxes for client devices, each of the sandboxes implemented as a virtual machine; and,
a computer system comprising:
a storage medium for storing computer components; and
a computerized hardware processor for executing the computer components comprising:
a first computer component for obtaining a sandbox on a server, the server including an operating system managed by the hypervisor, wherein the sandbox is configured according to system characteristics of the client device;
a second computer component for obtaining user activity data from a user activity data repository;
a third computer component for emulating web requests and responses of the client device by the virtual machine associated therewith, based on content of the user activity data, as implemented in the sandbox;
a fourth computer component for receiving web content from a remote service in response to the emulated web requests and responses of the client device, by the virtual machine; and
a fifth computer component for analyzing the behavior of the received web content in the sandbox for indications of at least one of anomalous or potentially malicious behavior.

17. The computer system of claim 16, wherein the analyzing the behavior of the received web content in the sandbox for indications of at least one of anomalous or potentially malicious behavior, comprises monitoring an operating system registry.

18. The computer system of claim 16, wherein the analyzing the behavior of the received web content in the sandbox for indications of at least one of anomalous or potentially malicious behavior, comprises monitoring a file system.

19. The computer system of claim 16, wherein the analyzing the behavior of the received web content in the sandbox for indications of at least one of anomalous or potentially malicious behavior, comprises monitoring network traffic.

20. The computer system of claim 16, wherein the analyzing the behavior of the received web content in the sandbox for indications of at least one of anomalous or potentially malicious behavior, comprises tracing a Central Processing Unit (CPU) of the client device and analyzing a log thereof.

21. The computer system of claim 16, wherein the analyzing the behavior of the received web content in the sandbox for indications of at least one of anomalous or potentially malicious behavior, comprises monitoring function calls.

22. The computer system of claim 16, wherein an alert is raised upon detecting anomalous or potentially malicious behavior of the web content.

23. The computer system of claim 16, wherein system characteristics of the client device are learned from an HTTP User-Agent attribute.

24. The computer system of claim 16, wherein system characteristics of the client device are learned via an agent on the client device.

25. The computer system of claim 16, wherein the emulating web requests and responses of the client device in the sandbox comprises emulating user activities in the web browser of the client device.

26. A computer-usable non-transitory storage medium having a computer program embodied thereon for causing a suitable programmed system to detect receipt of potentially malicious web content by a web client associated with a client device, by performing the following steps when such program is executed on the system, the steps comprising:
obtaining a sandbox on a server for the client device as generated by a hypervisor, the server including an operating system managed by the hypervisor, wherein the sandbox is configured according to system characteristics of the client device; and,
for each sandbox,
implementing said each sandbox as a virtual machine as managed by the hypervisor;
obtaining user activity data from a user activity data repository;
emulating web requests and responses of the client device by the virtual machine associated therewith, based on content of the user activity data, as implemented in the sandbox;
receiving web content from a remote service in response to the emulated web requests and responses of the client device, by the virtual machine; and
analyzing the behavior of the received web content in the sandbox for indications of at least one of anomalous or potentially malicious behavior.

27. The computer-usable non-transitory storage medium of claim 26, wherein the analyzing the behavior of the received web content in the sandbox for indications of at least one of anomalous or potentially malicious behavior, comprises monitoring an operating system registry.

28. The computer-usable non-transitory storage medium of claim 26, wherein the analyzing the behavior of the received web content in the sandbox for indications of at least one of anomalous or potentially malicious behavior, comprises monitoring a file system.

29. The computer-usable non-transitory storage medium of claim 26, wherein the analyzing the behavior of the received web content in the sandbox for indications of at least one of anomalous or potentially malicious behavior, comprises monitoring network traffic.

30. The computer-usable non-transitory storage medium of claim 26, wherein the analyzing the behavior of the received web content in the sandbox for indications of at least one of anomalous or potentially malicious behavior, comprises tracing a Central Processing Unit (CPU) of the client device and analyzing a log thereof.

31. The computer-usable non-transitory storage medium of claim 26, wherein the analyzing the behavior of the received web content in the sandbox for indications of at least one of anomalous or potentially malicious behavior, comprises monitoring function calls.

32. The computer-usable non-transitory storage medium of claim 26, wherein an alert is raised upon detecting anomalous or potentially malicious behavior of the web content.

33. The computer-usable non-transitory storage medium of claim 26, wherein system characteristics of the client device are learned from at least one of:
  an HTTP User-Agent attribute; and,
  via an agent on the client device.

34. The computer-usable non-transitory storage medium of claim 26, wherein the emulating web requests and responses of the client device in the sandbox comprises emulating user activities in the web browser of the client device.

\* \* \* \* \*